Patented Aug. 6, 1929.

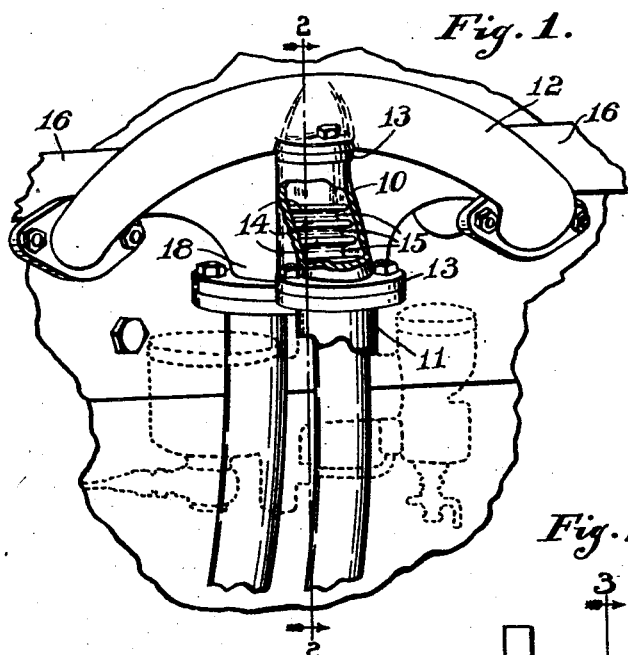
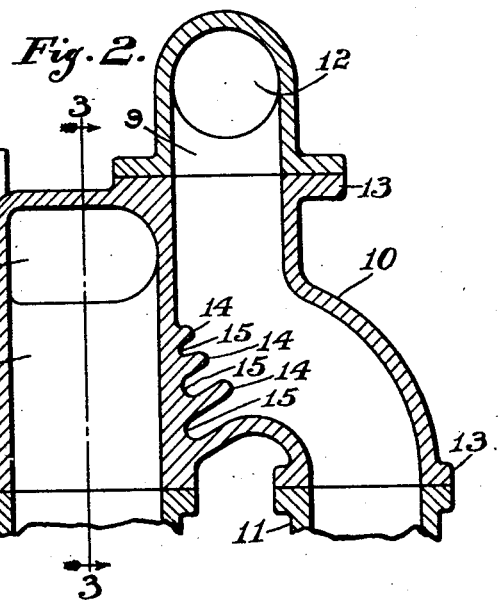
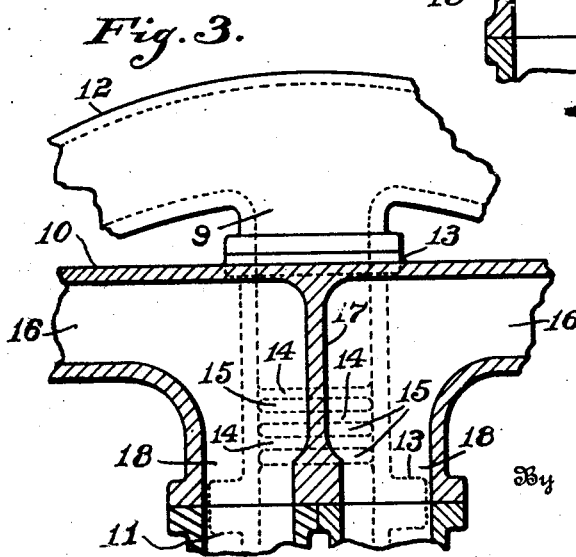

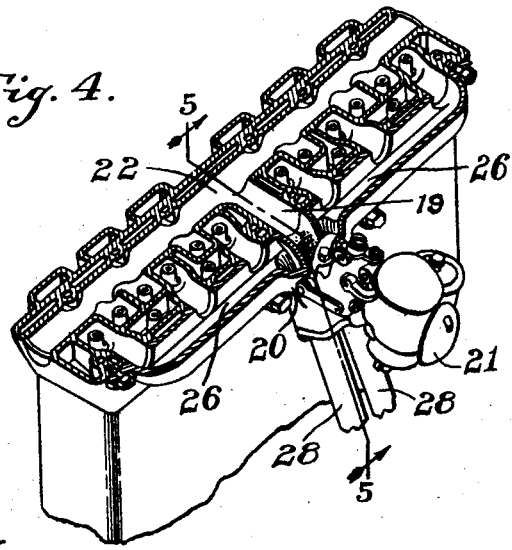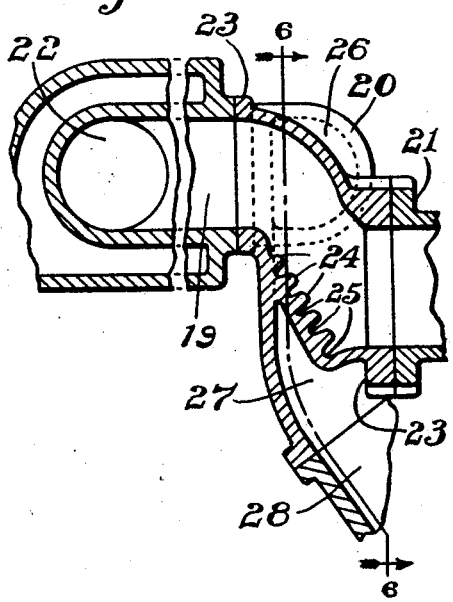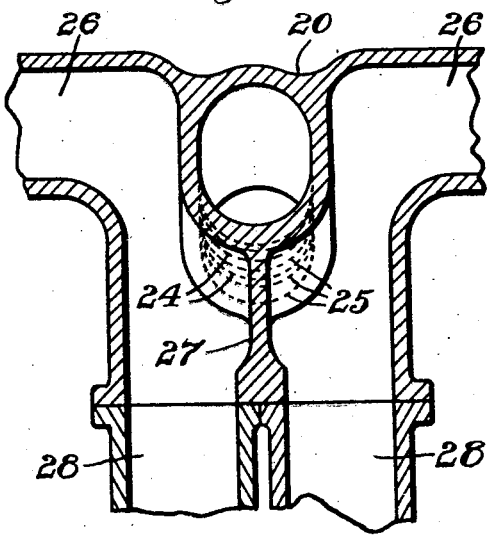

1,723,056

UNITED STATES PATENT OFFICE.

JOHN C. MOORE, OF CONNERSVILLE, INDIANA.

GASIFIER.

Application filed December 1, 1921. Serial No. 519,288.

It is the object of my invention to produce a simple and efficient gasifier, for use with internal combustion engines, whereby the fuel fractions which are ordinarily difficult or impossible to vaporize are largely or completely gasified; to obtain this action by a structure which is combined with the exhaust manifold but is separate from the intake manifold; to use the exhaust gases from all the cylinders for obtaining the heating of the gasifier; and to make such a gasifier which is adapted for the multiple exhaust system for internal combustion engines.

In attaining these ends, I provide a fitting which is inserted between the carburetor and the entrance tube to the intake manifold and through which the mixture from the carburetor passes on its way to the intake manifold and the engine; and in this fitting, which is the gasifier, I provide a series of ribs, preferably transverse ribs, between which pockets are formed in which still-liquid-fuel-fractions discharged from the carburetor collect, these ribs and pockets preferably being located at a curve in the passageway through the gasifier so that the depositing of such liquid particles will be insured; and I make this fitting so that it also has passages for the exhaust gases from the engine, so that such gases will impinge upon the walls provided with such ribs and heat such walls to gasify the liquid fuel collected in the pockets; and I preferably make the intake passage through the gasifier in a plane transverse to that of the passages for the exhaust gases, and provide a partition in the exhaust passage to divide it into two parts on opposite sides of the plane of the intake passage, so that one part of the exhaust passage may serve for part of the cylinders and the other for the remainder of the cylinders.

The accompanying drawings illustrate my invention, in two forms; Figs. 1, 2, and 3, relate to one form, and Figs. 4, 5, and 6, to another form; Fig. 1 is a perspective view of one form of gasifier embodying my invention, with the gasifier shell partly broken away to show the ribs and pockets; Fig. 2 is a transverse section approximately on the line 2—2 of Fig. 1; Fig. 3 is a fragmental longitudinal section, taken from the rear of the gasifier substantially on the line 3—3 of Fig. 2, showing its association with a multiple exhaust system, the gasifier ribs being shown in dotted lines; Fig. 4 is a sectional perspective view showing another form of gasifier embodying my invention; Fig. 5 is a transverse section through the gasifier, approximately on the line 5—5 of Fig. 4; and Fig. 6 is a fragmental longitudinal section, taken from the rear, substantially on the line 6—6 of Fig. 5, showing the association of this form of gasifier with the multiple exhaust system.

Referring first to the arrangement shown in Figs. 1, 2, and 3, the gasifier 10 is inserted in the intake passageway between the carburetor 11 and the entrance tube 9 to the intake manifold 12, being provided with flanges 13 by which it is attached to such parts. The entrance tube 9 leads to the intake manifold at about the middle thereof, as is customary practice, from which middle point the fuel divides to go to the several engine cylinders. The carburetor 11 shown is of the vertical type, which discharges vertically upward, so that the mixture from the carburetor enters the gasifier vertically; and such mixture also leaves the gasifier vertically where it enters the entrance tube to the intake manifold. The intake and outlet openings of the gasifier, however, are not in line, but instead the intake passage through the gasifier is curved, in a reverse curve, as shown, and ribs 14 are provided in this curved passageway on the lower wall of the passageway where it has a horizontal component. These ribs 14, are preferably transverse ribs, to provide a series of transverse pockets 15, which open obliquely upwardly. Any still liquid fractions of the fuel are partly or wholly deposited in these pockets 15, as the mixture from the carburetor flows through the intake passage of the gasifier to the intake manifold 12; and these deposited quantities of liquid fuel are gasified by heat from the exhaust gases, in a manner now to be explained, and the resultant gases escape from the pockets and join with the mixture from the carburetor and pass on therewith to the intake manifold and the engine.

The heat for this gasification is obtained from the exhaust gases, which are discharged, as shown, through a multiple exhaust system. To this end, the gasifier fitting 10 is made as the central part of the exhaust manifold fitting 16, which receives the exhausts from the several engine cylinders. The exhaust manifold, however, is not one continuous passageway in the multiple exhaust system, and so where this system is used the two halves of this exhaust manifold, which extends transversely to the plane of the intake passageway through the gasifier, are separated by a partition 17 which lies substantially in the plane of the intake passage through the gasifier; and close to this partition on the two sides thereof are two downward extensions 18 of the exhaust manifold for carrying off the exhausts from the cylinder groups which are respectively on opposite sides of the middle of the engine. This partition is directly beneath the ribs 14 and pockets 15, so that the wall on which such ribs and pockets are provided is also a wall of the exhaust manifold, against which wall the streams of exhaust gases from the two groups of cylinders impinge from opposite directions, to heat such wall to produce the gasification above referred to.

In the form of my invention shown in Figs. 4, 5, and 6, the gasifier 20 is connected between a horizontal type carburetor 21 and the entrance tube 19 of an intake manifold 22, being provided with suitable attaching flanges 23. The gasifier 20 receives its mixture-supply horizontally from the carburetor 21, and is shown as discharging it horizontally into the entrance tube 19 of the intake manifold 22, but the inlet opening to the gasifier 20 is lower than the outlet opening from the gasifier, and the two openings are connected by a curved passageway, shown as reversely curved. On the concave wall of this curved passage, opposite the intake opening from the carburetor, are a series of ribs 24, preferably transverse, which ribs form transverse pockets 25 between them. Fuel-fractions which are still liquid when discharged into the gasifier are deposited in these pockets 25, and are gasified by heat from the exhaust gases in substantially the same way as shown in Figs. 1, 2, and 3. Fuel collecting on the walls of the intake passage through the gasifier flows by gravity into such pockets 25, from all directions.

The intake manifold 22 is shown as being formed in the head block of the engine. As in the arrangement shown in Figs. 1, 2, and 3, the entrance tube 19 leads into the intake manifold at about the middle of such manifold, from which middle point the mixture divides to go to the two groups of engine cylinders respectively on opposite sides of such middle point.

To furnish the heat for the gasification of the liquid fuel, an exhaust manifold 26 is combined with the gasifier 20. This exhaust manifold is divided into two parts by a partition 27, which lies beneath and in substantially the same plane with the intake passage through the gasifier, and the exhaust manifold extends in opposite directions from such partition in a plane transverse to the plane of the intake passage through the gasifier. The exhaust manifold has two downward projections 28 close to but on opposite sides of the partition 27, for carrying off the exhausts from the two groups of cylinders on opposite sides of the middle point of the engine, and the exhaust gases from these two groups of cylinders impinge on this partition and on the outer side of the wall which on its inner side is provided with the ribs 24 and pockets 25, to heat such pockets and gasify any liquid fuel contained therein.

I claim as my invention:

1. A gasifier for internal combustion engines, comprising a member having a passageway through it for connection between the carburetor and the intake manifold, said passage being curved in a given plane and being provided with one or more pockets on a lower wall, and an exhaust manifold extending transversely to the plane in which said intake passage lies and associated with said passage so that exhaust gases from the engine impinge upon one side of the wall which on the other side is provided with said pocket or pockets, said exhaust manifold extending in opposite directions from said plane, and being provided with an outlet opening in the vicinity of said plane so that exhaust gases approach such plane along the exhaust manifold from both directions.

2. A gasifier for internal combustion engines, comprising a member having a passageway through it for connection between the carburetor and the intake manifold, said passage being curved in a given plane and being provided with one or more pockets on a lower wall, and an exhaust manifold extending transversely to the plane in which said intake passage lies and associated with said passage so that exhaust gases from the engine impinge upon one side of the wall which on the other side is provided with said pocket or pockets, said exhaust manifold being provided with a partition substantially in the plane of said intake passage through the gasifier, to divide the exhaust manifold into two parts, and each of said parts being provided with an outlet opening near such partition.

In witness whereof, I have hereunto set my hand at Connersville, Indiana, this 30th day of November, A. D. one thousand nine hundred and twenty-one.

JOHN C. MOORE.